[12] United States Patent
Dykstra

(10) Patent No.: US 8,950,502 B2
(45) Date of Patent: *Feb. 10, 2015

(54) SERIES CONFIGURED VARIABLE FLOW RESTRICTORS FOR USE IN A SUBTERRANEAN WELL

(75) Inventor: Jason Dykstra, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 548 days.

This patent is subject to a terminal disclaimer.

(21) Appl. No.: 13/359,617

(22) Filed: Jan. 27, 2012

(65) Prior Publication Data

US 2012/0125120 A1 May 24, 2012

Related U.S. Application Data

(63) Continuation-in-part of application No. 12/879,846, filed on Sep. 10, 2010, now Pat. No. 8,430,130.

(51) Int. Cl.
*E21B 34/06* (2006.01)
*F15C 1/16* (2006.01)
*G01F 1/32* (2006.01)
*E21B 43/12* (2006.01)

(52) U.S. Cl.
CPC . *G01F 1/32* (2013.01); *E21B 43/12* (2013.01); *G01F 1/3227* (2013.01)
USPC .............................. 166/373; 166/316; 137/809

(58) Field of Classification Search
USPC .............................. 166/373, 316; 137/808–814
See application file for complete search history.

(56) References Cited

U.S. PATENT DOCUMENTS

| | | | |
|---|---|---|---|
| 2,324,819 A | 6/1941 | Butzbach |
| 2,272,924 A | 2/1942 | Reichenbach |
| 3,078,862 A | 2/1963 | Maly |
| 3,091,393 A | 5/1963 | Sparrow |

(Continued)

FOREIGN PATENT DOCUMENTS

| | | |
|---|---|---|
| EP | 0834342 A2 | 4/1998 |
| EP | 1857633 A2 | 11/2007 |

(Continued)

OTHER PUBLICATIONS

Joseph M. Kirchner, "Fluid Amplifiers", 1996, 6 pages, McGraw-Hill, New York.

(Continued)

*Primary Examiner* — Giovanna Wright
*Assistant Examiner* — Wei Wang
(74) *Attorney, Agent, or Firm* — Smith IP Services, P.C.

(57) ABSTRACT

A well device can include a fluid diode having an interior surface that defines an interior chamber, and an outlet from the interior chamber, with the interior surface operable to direct fluid to rotate in a rotational direction through the outlet, and another fluid diode having an interior surface that defines an interior chamber in fluid communication with the outlet, the second interior surface operable to direct fluid to rotate in the rotational direction in response to receiving the fluid rotating in the rotational direction through the outlet. A method of controlling flow in a well can include communicating fluid through two or more fluid diodes in a flow path between an interior and an exterior of a well device in the well. Communicating the fluid through the fluid diodes can cause the fluid to rotate within the fluid diodes in a same rotational direction.

17 Claims, 7 Drawing Sheets

(56) References Cited

U.S. PATENT DOCUMENTS

| | | |
|---|---|---|
| 3,216,439 A | 11/1965 | Manion |
| 3,233,621 A | 2/1966 | Manion |
| 3,256,899 A | 6/1966 | Dexter et al. |
| 3,282,279 A | 11/1966 | Manion |
| 3,461,897 A | 8/1969 | Kwok |
| 3,470,894 A | 10/1969 | Rimmer |
| 3,474,670 A | 10/1969 | Rupert |
| 3,489,009 A | 1/1970 | Rimmer |
| 3,515,160 A | 6/1970 | Cohen |
| 3,521,657 A | 7/1970 | Ayers |
| 3,529,614 A | 9/1970 | Nelson |
| 3,537,466 A | 11/1970 | Chapin |
| 3,566,900 A | 3/1971 | Black |
| 3,586,104 A | 6/1971 | Hyde |
| 3,598,137 A | 8/1971 | Glaze |
| 3,620,238 A | 11/1971 | Kawabata |
| 3,670,753 A | 6/1972 | Healey |
| 3,704,832 A | 12/1972 | Fix et al. |
| 3,712,321 A | 1/1973 | Bauer |
| 3,717,164 A | 2/1973 | Griffin |
| 3,754,576 A | 8/1973 | Zetterstrom et al. |
| 3,776,460 A | 12/1973 | Fichter |
| 3,885,627 A | 5/1975 | Berry et al. |
| 3,942,557 A | 3/1976 | Tsuchiya |
| 4,029,127 A | 6/1977 | Thompson |
| 4,082,169 A | 4/1978 | Bowles |
| 4,187,909 A | 2/1980 | Erbstoesser |
| 4,276,943 A | 7/1981 | Holmes |
| 4,286,627 A | 9/1981 | Graf |
| 4,291,395 A | 9/1981 | Holmes |
| 4,323,991 A | 4/1982 | Holmes et al. |
| 4,385,875 A | 5/1983 | Kanazawa |
| 4,390,062 A | 6/1983 | Fox |
| 4,418,721 A | 12/1983 | Holmes |
| 4,557,295 A | 12/1985 | Holmes |
| 4,895,582 A | 1/1990 | Bielefeldt |
| 4,919,204 A | 4/1990 | Baker et al. |
| 5,184,678 A | 2/1993 | Pechkov et al. |
| 5,303,782 A | 4/1994 | Johannessen |
| 5,455,804 A | 10/1995 | Holmes et al. |
| 5,482,117 A | 1/1996 | Kolpak et al. |
| 5,484,016 A | 1/1996 | Surjaatmadja et al. |
| 5,533,571 A | 7/1996 | Surjaatmadja et al. |
| 5,570,744 A | 11/1996 | Weingarten et al. |
| 5,893,383 A | 4/1999 | Facteau |
| 6,015,011 A | 1/2000 | Hunter |
| 6,078,471 A | 6/2000 | Fiske |
| 6,109,372 A | 8/2000 | Dorel et al. |
| 6,112,817 A | 9/2000 | Voll et al. |
| 6,241,019 B1 | 6/2001 | Davidson et al. |
| 6,336,502 B1 | 1/2002 | Surjaatmadja et al. |
| 6,345,963 B1 | 2/2002 | Thomin et al. |
| 6,367,547 B1 | 4/2002 | Towers et al. |
| 6,371,210 B1 | 4/2002 | Bode et al. |
| 6,405,797 B2 | 6/2002 | Davidson et al. |
| 6,497,252 B1 | 12/2002 | Kohler et al. |
| 6,619,394 B2 | 9/2003 | Soliman et al. |
| 6,622,794 B2 | 9/2003 | Zisk, Jr. |
| 6,627,081 B1 | 9/2003 | Hilditch et al. |
| 6,644,412 B2 | 11/2003 | Bode et al. |
| 6,691,781 B2 | 2/2004 | Grant et al. |
| 6,719,048 B1 | 4/2004 | Ramos et al. |
| 6,851,473 B2 | 2/2005 | Davidson |
| 6,976,507 B1 | 12/2005 | Webb et al. |
| 7,025,134 B2 | 4/2006 | Byrd et al. |
| 7,114,560 B2 | 10/2006 | Nguyen et al. |
| 7,185,706 B2 | 3/2007 | Freyer |
| 7,213,650 B2 | 5/2007 | Lehman et al. |
| 7,213,681 B2 | 5/2007 | Birchak et al. |
| 7,216,738 B2 | 5/2007 | Birchak et al. |
| 7,290,606 B2 | 11/2007 | Coronado et al. |
| 7,318,471 B2 | 1/2008 | Rodney et al. |
| 7,404,416 B2 | 7/2008 | Schultz et al. |
| 7,405,998 B2 | 7/2008 | Webb et al. |
| 7,409,999 B2 | 8/2008 | Henriksen et al. |
| 7,413,010 B2 | 8/2008 | Blauch et al. |
| 7,537,056 B2 | 5/2009 | MacDougall |
| 7,578,343 B2 | 8/2009 | Augustine |
| 7,621,336 B2 | 11/2009 | Badalamenti et al. |
| 7,828,067 B2 | 11/2010 | Scott et al. |
| 7,857,050 B2 | 12/2010 | Zazovsky et al. |
| 8,127,856 B1 | 3/2012 | Nish et al. |
| 8,235,128 B2 | 8/2012 | Dykstra et al. |
| 8,302,696 B2 | 11/2012 | Williams et al. |
| 8,327,885 B2 | 12/2012 | Dykstra et al. |
| 2006/0131033 A1 | 6/2006 | Bode |
| 2007/0028977 A1 | 2/2007 | Goulet |
| 2007/0045038 A1 | 3/2007 | Han et al. |
| 2007/0246213 A1* | 10/2007 | Hailey, Jr. ............ 166/278 |
| 2007/0246407 A1 | 10/2007 | Richards et al. |
| 2007/0256828 A1 | 11/2007 | Birchak et al. |
| 2008/0035350 A1 | 2/2008 | Henriksen et al. |
| 2008/0041580 A1 | 2/2008 | Freyer et al. |
| 2008/0041581 A1 | 2/2008 | Richards |
| 2008/0041582 A1 | 2/2008 | Saetre et al. |
| 2008/0041588 A1 | 2/2008 | Richards et al. |
| 2008/0149323 A1 | 6/2008 | O'Malley et al. |
| 2008/0169099 A1 | 7/2008 | Pensgaard |
| 2008/0283238 A1 | 11/2008 | Richards et al. |
| 2008/0314590 A1 | 12/2008 | Patel |
| 2009/0000787 A1 | 1/2009 | Hill et al. |
| 2009/0008088 A1 | 1/2009 | Schultz et al. |
| 2009/0008090 A1 | 1/2009 | Schultz et al. |
| 2009/0009297 A1 | 1/2009 | Shinohara et al. |
| 2009/0009333 A1 | 1/2009 | Bhogal et al. |
| 2009/0009336 A1 | 1/2009 | Ishikawa |
| 2009/0009412 A1 | 1/2009 | Warther |
| 2009/0009437 A1 | 1/2009 | Hwang et al. |
| 2009/0009445 A1 | 1/2009 | Lee |
| 2009/0009447 A1 | 1/2009 | Naka et al. |
| 2009/0065197 A1 | 3/2009 | Eslinger |
| 2009/0078427 A1 | 3/2009 | Patel |
| 2009/0078428 A1 | 3/2009 | Ali |
| 2009/0101352 A1 | 4/2009 | Coronado et al. |
| 2009/0101354 A1 | 4/2009 | Holmes et al. |
| 2009/0120647 A1 | 5/2009 | Turick et al. |
| 2009/0133869 A1 | 5/2009 | Clem |
| 2009/0151925 A1 | 6/2009 | Richards et al. |
| 2009/0159282 A1 | 6/2009 | Webb et al. |
| 2009/0250224 A1 | 10/2009 | Wright et al. |
| 2009/0277639 A1 | 11/2009 | Schultz et al. |
| 2009/0277650 A1 | 11/2009 | Casciaro et al. |
| 2011/0042091 A1 | 2/2011 | Dykstra et al. |
| 2011/0042092 A1 | 2/2011 | Fripp et al. |
| 2011/0079384 A1 | 4/2011 | Russell et al. |
| 2011/0186300 A1 | 8/2011 | Dykstra et al. |
| 2011/0198097 A1 | 8/2011 | Moen |
| 2011/0214876 A1 | 9/2011 | Dykstra et al. |
| 2011/0297384 A1 | 12/2011 | Fripp et al. |
| 2011/0297385 A1 | 12/2011 | Dykstra et al. |
| 2012/0048563 A1 | 3/2012 | Holderman |
| 2012/0060624 A1 | 3/2012 | Dykstra |
| 2012/0061088 A1 | 3/2012 | Dykstra et al. |
| 2012/0125626 A1 | 5/2012 | Constantine |
| 2012/0305243 A1 | 12/2012 | Hallundbaek et al. |
| 2013/0020088 A1 | 1/2013 | Dyer et al. |

FOREIGN PATENT DOCUMENTS

| | | |
|---|---|---|
| EP | 2146049 A2 | 1/2010 |
| WO | 0214647 A1 | 2/2002 |
| WO | 03062597 A1 | 7/2003 |
| WO | 2004033063 A2 | 4/2004 |
| WO | 2004106792 A1 | 12/2004 |
| WO | 2008024645 A2 | 2/2008 |
| WO | 2009052076 A2 | 4/2009 |
| WO | 2009052103 A2 | 4/2009 |
| WO | 2009052149 A2 | 4/2009 |
| WO | 2009081088 A2 | 7/2009 |
| WO | 2009088292 A1 | 7/2009 |
| WO | 2009088293 A1 | 7/2009 |
| WO | 2009088624 A2 | 7/2009 |
| WO | 2010053378 A2 | 5/2010 |

(56) References Cited

FOREIGN PATENT DOCUMENTS

| WO | 2010087719 A1 | 8/2010 |
|---|---|---|
| WO | 2011095512 A2 | 8/2011 |
| WO | 2011115494 A1 | 9/2011 |

OTHER PUBLICATIONS

Joseph M. Kirchner, et al., "Design Theory of Fluidic Components", 1975, 9 pages, Academic Press, New York.
Microsoft Corporation, "Fluidics" article, Microsoft Encarta Online Encyclopedia, copyright 1997-2009, 1 page, USA.
The Lee Company Technical Center, "Technical Hydraulic Handbook" 11th Edition, copyright 1971-2009, 7 pages, Connecticut.
Specification and Drawings for U.S. Appl. No. 12/792,095, filed Jun. 2, 2010, 29 pages.
Specification and Drawings for U.S. Appl. No. 10/650,186, filed Aug. 28, 2003, 16 pages.
Apparatus and Method of Inducing Fluidic Oscillation in a Rotating Cleaning Nozzle, ip.com, dated Apr. 24, 2007, 3 pages.
U.S. Appl. No. 13/351,035, filed Jan. 16, 2012, 62 pages.
U.S. Appl. No. 13/084,025, filed Apr. 11, 2011, 45 pages.
U.S. Appl. No. 12/958,625, filed Dec. 2, 2010, 37 pages.
U.S. Appl. No. 12/974,212, filed Dec. 21, 2010, 41 pages.
Office Action issued Mar. 7, 2012 for U.S. Appl. No. 12/792,117, 40 pages.
Office Action issued Mar. 8, 2012 for U.S. Appl. No. 12/792,146, 26 pages.
Office Action issued Apr. 23, 2013 for U.S. Appl. No. 13/659,323, 65 pages.
Office Action issued Apr. 24, 2013 for U.S. Appl. No. 13/633,693, 33 pages.
Office Action issued Apr. 26, 2013 for U.S. Appl. No. 13/678,489, 51 pages.
Office Action issued May 8, 2013 for U.S. Appl. No. 12/792,095, 14 pages.
Office Action issued May 29, 2013 for U.S. Appl. No. 12/881,296, 26 pages.
Stanley W. Angrist; "Fluid Control Devices", Scientific American Magazine, dated Dec. 1964, 8 pages.
Rune Freyer et al.; "An Oil Selective Inflow Control System", Society of Petroleum Engineers Inc. paper, SPE 78272, dated Oct. 29-31, 2002, 8 pages.
Specification and Drawings for U.S. Appl. No. 13/495,078, filed Jun. 13, 2012, 39 pages.
International Search Report with Written Opinion issued Jan. 5, 2012 for PCT Patent Application No. PCT/US2011/047925, 9 pages.
Stanley W. Angrist; "Fluid Control Devices", published Dec. 1964, 5 pages.
Office Action issued Nov. 2, 2011 for U.S. Appl. No. 12/792,146, 34 pages.
Office Action issued Nov. 3, 2011 for U.S. Appl. No. 13/111,169, 16 pages.
Office Action issued Nov. 2, 2011 for U.S. Appl. No. 12/792,117, 35 pages.
Office Action issued Oct. 27, 2011 for U.S. Appl. No. 12/791,993, 15 pages.
International Search Report with Written Opinion dated Aug. 31, 2012 for PCT Patent Application No. PCT/US11/060606, 10 pages.
Office Action issued Sep. 19, 2012 for U.S. Appl. No. 12/879,846, 78 pages.
Office Action issued Sep. 19, 2012 for U.S. Appl. No. 113/495,078, 29 pages.
Office Action issued Nov. 5, 2013 for U.S. Appl. No. 13/084,025, 23 pages.
Specification and Drawings for U.S. Appl. No. 13/659,323, filed Oct. 24, 2012, 81 pages.
Specification and Drawings for U.S. Appl. No. 13/659,375, filed Oct. 24, 2012, 54 pages.
Specification and Drawings for U.S. Appl. No. 13/659,435, filed Oct. 24, 2012, 37 pages.
Advisory Action issued Mar. 14, 2013 for U.S. Appl. No. 13/495,078, 14 pages.
Office Action issued Mar. 15, 2013 for U.S. Appl. No. 13/659,435, 20 pages.
Lee Precision Micro Hydraulics, Lee Restrictor Selector product brochure; Jan. 2011, 9 pages.
Tesar, V.; Fluidic Valves for Variable-Configuration Gas Treatment; Chemical Engineering Research and Design journal; Sep. 2005; pp. 1111-1121, 83(A9); Trans IChemE; Rugby, Warwickshire, UK.
Tesar, V.; Sampling by Fluidics and Microfluidics; Acta Polytechnica; Feb. 2002; pp. 41-49; vol. 42; The University of Sheffield; Sheffield, UK.
Tesar, V., Konig, A., Macek, J., and Baumruk, P.; New Ways of Fluid Flow Control in Automobiles: Experience with Exhaust Gas Aftertreament Control; 2000 FISITA World Automotive Congress; Jun. 12-15, 2000; 8 pages; F2000H192; Seoul, Korea.
International Search Report and Written Opinion issued Mar. 25, 2011 for International Patent Application Serial No. PCT/US2010/044409, 9 pages.
International Search Report and Written Opinion issued Mar. 31, 2011 for International Patent Application Serial No. PCT/US2010/044421, 9 pages.
Office Action issued Jun. 26, 2011 for U.S. Appl. No. 12/791,993, 17 pages.
Office Action issued Oct. 26, 2011 for U.S. Appl. No. 13/111,169, 28 pages.
International Search Report and Written Opinion issued Jan. 5, 2012 for International Patent Application Serial No. PCT/US2011/047925, 9 pages.
International Search Report and Written Opinion issued Mar. 26, 2012 for International Patent Application Serial No. PCT/US2011/048986, 9 pages.
International Search Report and Written Opinion issued Apr. 17, 2012 for International Patent Application Serial No. PCT/US2011/050255, 9 pages.
Office Action issued May 24, 2012 for U.S. Appl. No. 13/430,507, 17 pages.
Specification and Drawings for U.S. Appl. No. 13/430,507, filed Mar. 26, 2012, 28 pages.
Search Report issued Apr. 30, 2014 for European Patent Application No. 11823950.8, 6 pages.
Office Action issued Jul. 25, 2012 for U.S. Appl. No. 12/881,296, 61 pages.
Office Action issued Aug. 7, 2013 for U.S. Appl. No. 13/659,323, 37 pages.
Office Action issued Aug. 7, 2013 for U.S. Appl. No. 13/678,489, 24 pages.
Specification and Drawings for U.S. Appl. No. 12/542,695, filed Aug. 18, 2009, 32 pages.
International Search Report with Written Opinion issued Aug. 3, 2012 for PCT Patent Application No. PCT/US11/059530, 15 pages.
International Search Report with Written Opinion issued Aug. 3, 2012 for PCT Patent Application No. PCT/US11/059534, 14 pages.
Advisory Action issued Aug. 30, 2012 for U.S. Appl. No. 13/111,169, 15 pages.
Office Action issued Sep. 10, 2012 for U.S. Appl. No. 12/792,095, 59 pages.
Office Action issued Oct. 11, 2013 for U.S. Appl. No. 12/792,095, 18 pages.
Search Report and Written Opinion issued Oct. 19, 2012 for International Application No. PCT/US12/30641, 9 pages.
Office Action issued Aug. 20, 2013 for U.S. Appl. No. 13/659,375, 24 pages.
Office Action issued Aug. 23, 2013 for U.S. Appl. No. 13/084,025, 93 pages.
Office Action issued Jan. 17, 2013 for U.S. Appl. No. 12/879,846, 26 pages.
Office Action issued Jan. 16, 2013 for U.S. Appl. No. 13/495,078, 24 pages.
Office Action issued Jan. 22, 2013 for U.S. Appl. No. 13/633,693, 30 pages.

(56) References Cited

OTHER PUBLICATIONS

Office Action issued Dec. 28, 2012 for U.S. Appl. No. 12/881,296, 29 pages.
Office Action issued Dec. 24, 2013 for U.S. Appl. No. 12/881,296, 30 pages.
Advisory Action issued Dec. 27, 2013 for U.S. Appl. No. 12/792,095, 8 pages.
Australian Examination Report No. 1 issued Apr. 8, 2014 for AU Patent Application No. 2013200245, 3 pages.
Australian Examination Report No. 2 issued Sep. 18, 2014 for AU Patent Application No. 2013200245, 4 pages.

* cited by examiner

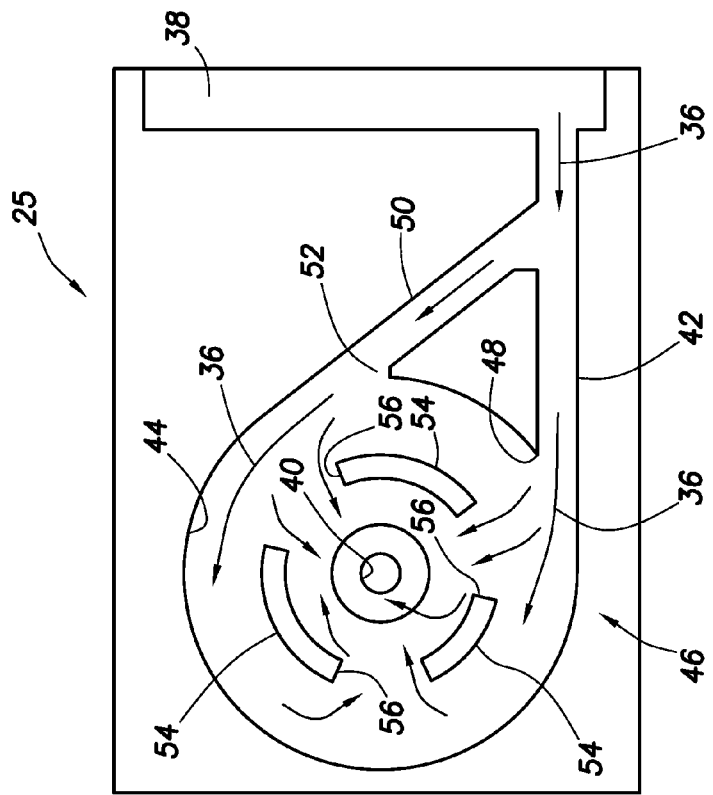
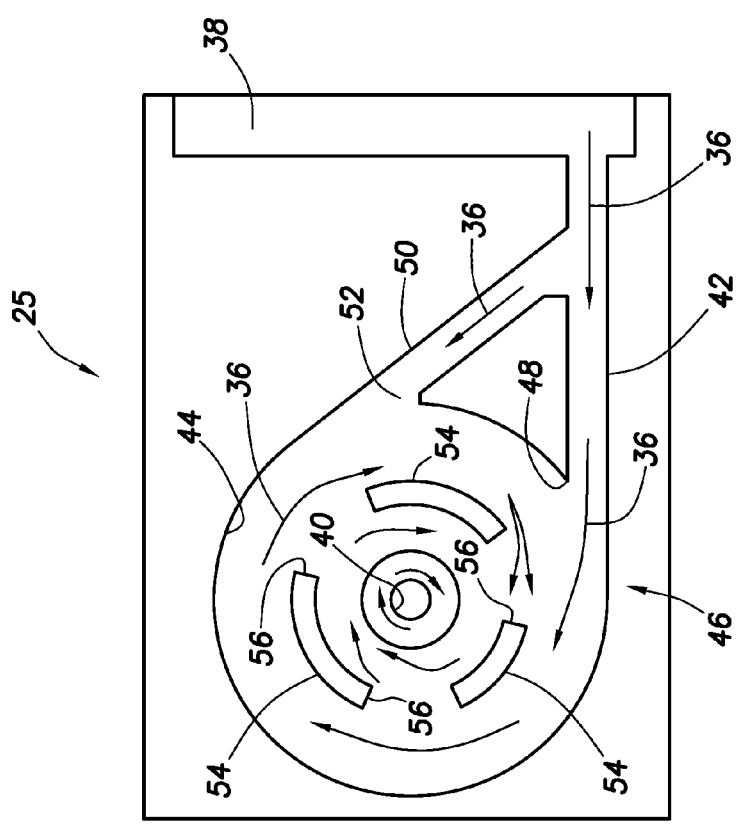
FIG.3B
FIG.3A

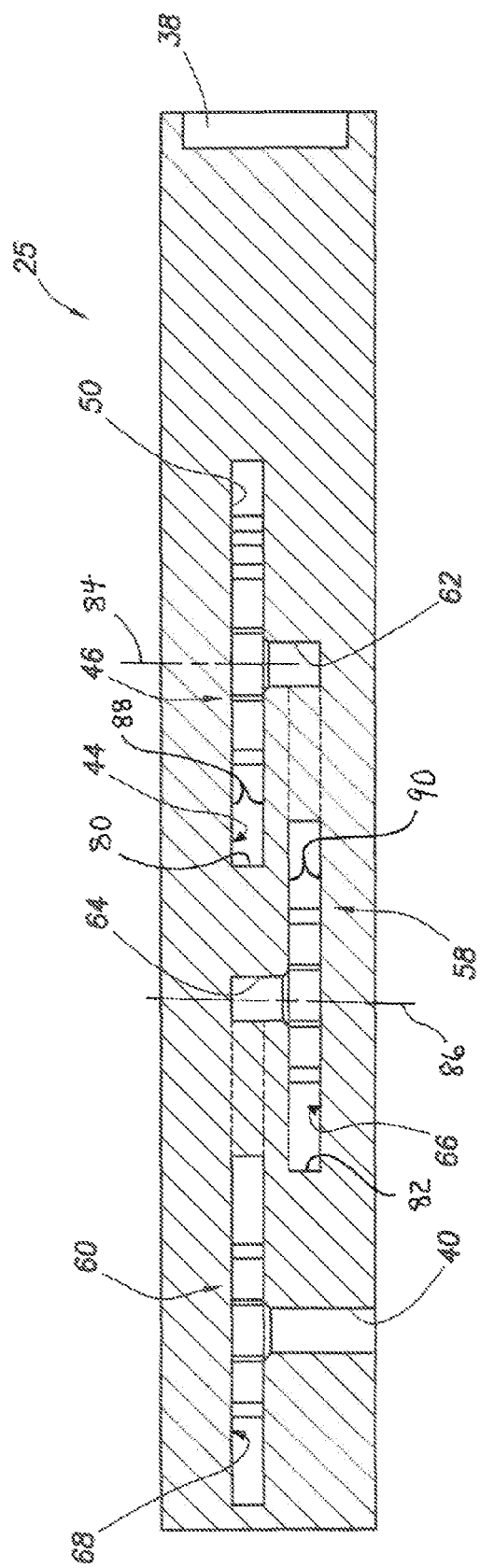

SERIES CONFIGURED VARIABLE FLOW RESTRICTORS FOR USE IN A SUBTERRANEAN WELL

CROSS-REFERENCE TO RELATED APPLICATION

This application is a continuation-in-part of U.S. application Ser. No. 12/879,846, filed 10 Sep. 2010, the entire disclosure of which is incorporated herein by this reference.

BACKGROUND

This disclosure relates generally to equipment utilized and operations performed in conjunction with a subterranean well and, in an example described below, more particularly provides a series configuration of variable flow restrictors.

In a hydrocarbon production well, it is many times beneficial to be able to regulate flow of fluids from an earth formation into a wellbore. A variety of purposes may be served by such regulation, including prevention of water or gas coning, minimizing sand production, minimizing water and/or gas production, maximizing oil and/or gas production, balancing production among zones, etc.

In an injection well, it is typically desirable to evenly inject water, steam, gas, etc., into multiple zones, so that hydrocarbons are displaced evenly through an earth formation, without the injected fluid prematurely breaking through to a production wellbore. Thus, the ability to regulate flow of fluids from a wellbore into an earth formation can also be beneficial for injection wells.

Therefore, it will be appreciated that advancements in the art of controlling fluid flow in a well would be desirable in the circumstances mentioned above, and such advancements would also be beneficial in a wide variety of other circumstances.

SUMMARY

In the disclosure below, a variable flow resistance system is provided which brings improvements to the art of regulating fluid flow in wells. One example is described below in which resistance to flow through a vortex device is dependent on a rotation of a fluid composition as it enters the vortex device. Another example is described, in which multiple vortex devices are connected in series.

In one aspect, the disclosure provides to the art a variable flow resistance system for use in a subterranean well. The system can include a vortex device through which a fluid composition flows. A resistance to flow of the fluid composition through the vortex device is dependent on a rotation of the fluid composition at an inlet to the vortex device.

In another aspect, a variable flow resistance system described below can include a first vortex device having an outlet, and a second vortex device which receives a fluid composition from the outlet of the first vortex device. A resistance to flow of the fluid composition through the second vortex device is dependent on a rotation of the fluid composition at the outlet of the first vortex device.

In yet another aspect, a variable flow resistance system can include a first vortex device which causes increased rotation of a fluid composition at an outlet of the first vortex device in response to an increase in a velocity of the fluid composition, and a second vortex device which receives the fluid composition from the outlet of the first vortex device. A resistance to flow of the fluid composition through the second vortex device is dependent on the rotation of the fluid composition at the outlet of the first vortex device.

A well device for installation in a wellbore in a subterranean zone is also described below. In one example, the device includes a first fluid diode comprising a first interior surface that defines a first interior chamber, and an outlet from the first interior chamber, the first interior surface operable to direct fluid to rotate in a rotational direction through the outlet; and a second fluid diode comprising a second interior surface that defines a second interior chamber in fluid communication with the outlet, the second interior surface operable to direct fluid to rotate in the rotational direction in response to receiving the fluid rotating in the rotational direction through the outlet.

The disclosure below also describes a method of controlling flow in a wellbore in a subterranean zone. An example is described in which the method comprises communicating fluid through a first fluid diode and a second fluid diode in a flow path between an interior and an exterior of a well device in the subterranean zone. Communicating the fluid through the first fluid diode and the second fluid diode can cause the fluid to rotate within the first fluid diode in a rotational direction and to rotate within the second fluid diode in the rotational direction.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIGS. 3A & B are representative "unrolled" cross-sectional views of one configuration of the variable flow resistance system, taken along line 3-3 of FIG. 2.

FIG. 5 is a representative cross-sectional view of the variable flow resistance system of FIG. 4, taken along line 5-5.

DETAILED DESCRIPTION

Figure 1:
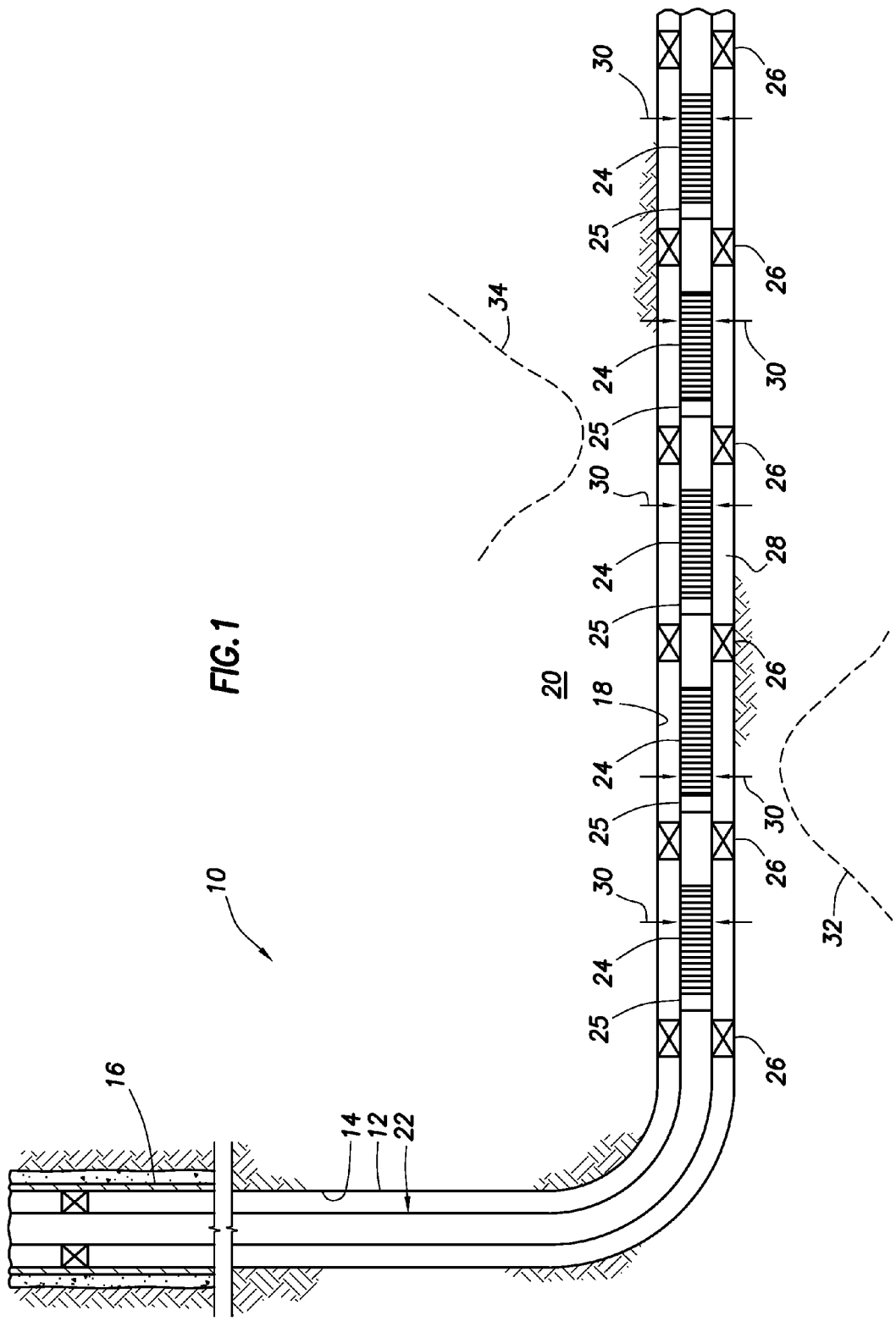
FIG. 1 is a representative partially cross-sectional view of a well system which can embody principles of the present disclosure.

Representatively illustrated in FIG. 1 is a well system 10 which can embody principles of this disclosure. As depicted in FIG. 1, a wellbore 12 has a generally vertical uncased section 14 extending downwardly from casing 16, as well as a generally horizontal uncased section 18 extending through an earth formation 20.

A tubular string 22 (such as a production tubing string) is installed in the wellbore 12. Interconnected in the tubular string 22 are multiple well screens 24, variable flow resistance systems 25 and packers 26.

The packers 26 seal off an annulus 28 formed radially between the tubular string 22 and the wellbore section 18. In this manner, fluids 30 may be produced from multiple intervals or zones of the formation 20 via isolated portions of the annulus 28 between adjacent pairs of the packers 26.

Positioned between each adjacent pair of the packers 26, a well screen 24 and a variable flow resistance system 25 are interconnected in the tubular string 22. The well screen 24 filters the fluids 30 flowing into the tubular string 22 from the annulus 28. The variable flow resistance system 25 variably restricts flow of the fluids 30 into the tubular string 22, based on certain characteristics of the fluids.

At this point, it should be noted that the well system 10 is illustrated in the drawings and is described herein as merely one example of a wide variety of well systems in which the principles of this disclosure can be utilized. It should be clearly understood that the principles of this disclosure are not limited at all to any of the details of the well system 10, or components thereof, depicted in the drawings or described herein.

For example, it is not necessary in keeping with the principles of this disclosure for the wellbore 12 to include a generally vertical wellbore section 14 or a generally horizontal wellbore section 18. It is not necessary for fluids 30 to be only produced from the formation 20 since, in other examples, fluids could be injected into a formation, fluids could be both injected into and produced from a formation, etc.

It is not necessary for one each of the well screen 24 and variable flow resistance system 25 to be positioned between each adjacent pair of the packers 26. It is not necessary for a single variable flow resistance system 25 to be used in conjunction with a single well screen 24. Any number, arrangement and/or combination of these components may be used.

It is not necessary for any variable flow resistance system 25 to be used with a well screen 24. For example, in injection operations, the injected fluid could be flowed through a variable flow resistance system 25, without also flowing through a well screen 24.

It is not necessary for the well screens 24, variable flow resistance systems 25, packers 26 or any other components of the tubular string 22 to be positioned in uncased sections 14, 18 of the wellbore 12. Any section of the wellbore 12 may be cased or uncased, and any portion of the tubular string 22 may be positioned in an uncased or cased section of the wellbore, in keeping with the principles of this disclosure.

It should be clearly understood, therefore, that this disclosure describes how to make and use certain examples, but the principles of the disclosure are not limited to any details of those examples. Instead, those principles can be applied to a variety of other examples using the knowledge obtained from this disclosure.

It will be appreciated by those skilled in the art that it would be beneficial to be able to regulate flow of the fluids 30 into the tubular string 22 from each zone of the formation 20, for example, to prevent water coning 32 or gas coning 34 in the formation. Other uses for flow regulation in a well include, but are not limited to, balancing production from (or injection into) multiple zones, minimizing production or injection of undesired fluids, maximizing production or injection of desired fluids, etc.

Examples of the variable flow resistance systems 25 described more fully below can provide these benefits by increasing resistance to flow if a fluid velocity increases beyond a selected level (e.g., to thereby balance flow among zones, prevent water or gas coning, etc.), and/or increasing resistance to flow if a fluid viscosity decreases below a selected level (e.g., to thereby restrict flow of an undesired fluid, such as water or gas, in an oil producing well).

As used herein, the term "viscosity" is used to indicate any of the rheological properties including kinematic viscosity, yield strength, viscoplasticity, surface tension, wettability, etc.

Whether a fluid is a desired or an undesired fluid depends on the purpose of the production or injection operation being conducted. For example, if it is desired to produce oil from a well, but not to produce water or gas, then oil is a desired fluid and water and gas are undesired fluids. If it is desired to produce gas from a well, but not to produce water or oil, the gas is a desired fluid, and water and oil are undesired fluids. If it is desired to inject steam into a formation, but not to inject water, then steam is a desired fluid and water is an undesired fluid.

If gas is being flowed, it can be difficult to restrict flow of the gas using conventional techniques, which typically involve interposing small diameter passages, orifices, etc. in the gas flow. Unfortunately, these devices can have an increased volumetric flow rate when gas is flowing instead of oil or another fluid, and can result in erosion problems.

Note that, at downhole temperatures and pressures, hydrocarbon gas can actually be completely or partially in liquid phase. Thus, it should be understood that when the term "gas" is used herein, supercritical, liquid, condensate and/or gaseous phases are included within the scope of that term.

Figure 2:
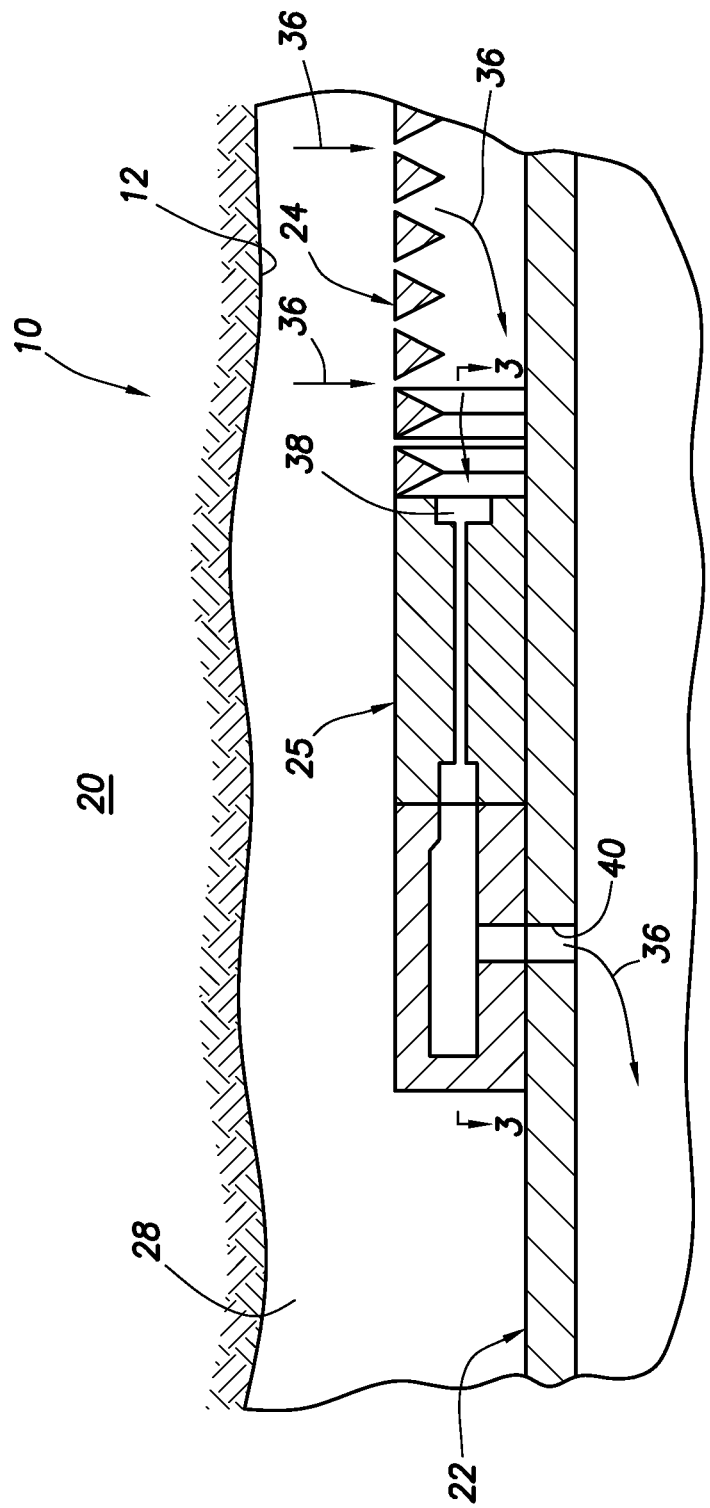
FIG. 2 is an enlarged scale representative cross-sectional view of a well screen and a variable flow resistance system which may be used in the well system of FIG. 1.

Referring additionally now to FIG. 2, an enlarged scale cross-sectional view of one of the variable flow resistance systems 25 and a portion of one of the well screens 24 is representatively illustrated. In this example, a fluid composition 36 (which can include one or more fluids, such as oil and water, liquid water and steam, oil and gas, gas and water, oil, water and gas, etc.) flows into the well screen 24, is thereby filtered, and then flows into an inlet 38 of the variable flow resistance system 25.

A fluid composition can include one or more undesired or desired fluids. Both steam and water can be combined in a fluid composition. As another example, oil, water and/or gas can be combined in a fluid composition.

Flow of the fluid composition 36 through the variable flow resistance system 25 is resisted based on one or more characteristics (such as viscosity, velocity, density, etc.) of the fluid composition. The fluid composition 36 is then discharged from the variable flow resistance system 25 to an interior of the tubular string 22 via an outlet 40.

In other examples, the well screen 24 may not be used in conjunction with the variable flow resistance system 25 (e.g., in injection operations), the fluid composition 36 could flow in an opposite direction through the various elements of the well system 10 (e.g., in injection operations), a single variable flow resistance system could be used in conjunction with multiple well screens, multiple variable flow resistance systems could be used with one or more well screens, the fluid composition could be received from or discharged into regions of a well other than an annulus or a tubular string, the fluid composition could flow through the variable flow resistance system prior to flowing through the well screen, any other components could be interconnected upstream or downstream of the well screen and/or variable flow resistance system, etc. Thus, it will be appreciated that the principles of this disclosure are not limited at all to the details of the example depicted in FIG. 2 and described herein.

Although the well screen 24 depicted in FIG. 2 is of the type known to those skilled in the art as a wire-wrapped well screen, any other types or combinations of well screens (such as sintered, expanded, pre-packed, wire mesh, etc.) may be used in other examples. Additional components (such as shrouds, shunt tubes, lines, instrumentation, sensors, inflow control devices, etc.) may also be used, if desired.

The variable flow resistance system 25 is depicted in simplified form in FIG. 2, but in a preferred example the system can include various passages and devices for performing various functions, as described more fully below. In addition, the system 25 can at least partially extend circumferentially about the tubular string 22, or the system may be formed in a wall of a tubular structure interconnected as part of the tubular string.

In other examples, the system 25 may not extend circumferentially about a tubular string or be formed in a wall of a tubular structure. For example, the system 25 could be formed in a flat structure, etc. The system 25 could be in a separate housing that is attached to the tubular string 22, or it could be oriented so that the axis of the outlet 40 is parallel to the axis of the tubular string. The system 25 could be on a logging string or attached to a device that is not tubular in shape. Any orientation or configuration of the system 25 may be used in keeping with the principles of this disclosure.

Referring additionally now to FIGS. 3A & B, a more detailed cross-sectional view of one example of the system 25 is representatively illustrated. The system 25 is depicted in FIGS. 3A & B as if it is "unrolled" from its circumferentially extending configuration to a generally planar configuration.

As described above, the fluid composition 36 enters the system 25 via the inlet 38, and exits the system via the outlet 40. A resistance to flow of the fluid composition 36 through the system 25 varies based on one or more characteristics of the fluid composition.

The inlet 38, the outlet 40, and a flow passage 42 and flow chamber 44 through which the fluid composition 36 flows between the inlet and the outlet, are elements of a vortex device 46 which restricts flow of the fluid composition based on certain characteristics of the fluid composition. Rotational flow of the fluid composition 36 increases in the chamber 44, thereby increasing restriction to flow through the chamber, for example, when a velocity of the fluid composition increases, when a viscosity of the fluid composition decreases, when a density of the fluid composition increases, and/or when a ratio of desired fluid to undesired fluid in the fluid composition decreases.

As depicted in FIG. 3A, the chamber 44 is generally cylindrical-shaped, and the flow passage 42 intersects the chamber tangentially, so that fluid entering the chamber via the inlet 48 tends to flow clockwise (as viewed in FIG. 3A) about the outlet 40. A bypass passage 50 intersects the passage 42 downstream of the inlet 38, and the bypass passage also intersects the chamber 44 tangentially. However, fluid entering the chamber 44 through the bypass passage 50 via an inlet 52 tends to flow counterclockwise (as viewed in FIG. 3A) about the outlet 40.

In FIG. 3A, a relatively high velocity and/or low viscosity fluid composition 36 flows through the flow passage 42 from the system inlet 38 to the flow chamber 44. In contrast, a relatively low velocity and/or high viscosity fluid composition 36 flows through the flow passage 42 to the chamber 44 in FIG. 3B.

Only a small proportion of the fluid composition 36 flows to the chamber 44 via the bypass passage 50 in FIG. 3A. Thus, a substantial proportion of the fluid composition 36 rotates in the chamber 44, spiraling with increasing rotational velocity toward the outlet 40. Note that the rotation of the fluid composition 36 at the outlet 40 will increase as the velocity of the fluid composition entering the inlet 38 increases, and as a viscosity of the fluid composition decreases.

A substantially larger proportion of the fluid composition flows to the chamber 44 via the bypass passage 50 in FIG. 3B. In this example, the flows entering the chamber 44 via the inlets 48, 52 are about equal. These flows effectively "cancel" or counteract each other, so that there is relatively little rotational flow of the fluid composition 36 in the chamber 44.

It will be appreciated that the much more circuitous flow path taken by the fluid composition 36 in the example of FIG. 3A dissipates more of the fluid composition's energy at the same flow rate and, thus, results in more resistance to flow, as compared to the much more direct flow path taken by the fluid composition in the example of FIG. 3B. If oil is a desired fluid, and water and/or gas are undesired fluids, then it will be appreciated that the variable flow resistance system 25 of FIGS. 3A & B will provide less resistance to flow of the fluid composition 36 when it has an increased ratio of desired to undesired fluid therein, and will provide greater resistance to flow when the fluid composition has a decreased ratio of desired to undesired fluid therein.

Since the chamber 44 in this example has a cylindrical shape with a central outlet 40, and the fluid composition 36 (at least in FIG. 3A) spirals about the chamber, increasing in velocity as it nears the outlet, driven by a pressure differential from the inlet 44 to the outlet, the chamber may be referred to as a "vortex" chamber.

Circular flow inducing structures 54 are used in the chamber 44 in the configuration of FIGS. 3A & B. The structures 54 operate to maintain circular flow of the fluid composition 36 about the outlet 40, or at least to impede inward flow of the fluid composition toward the outlet, when the fluid composition does flow circularly about the outlet. Openings 56 in the structures 54 permit the fluid composition 36 to eventually flow inward to the outlet 40.

As discussed above, in FIG. 3A, the vortex device 46 is depicted in a situation in which an increased velocity and/or reduced viscosity of the fluid composition 36 results in a substantial proportion of the fluid composition flowing into the chamber 44 via the inlet 48. The fluid composition 36, thus, spirals about the outlet 40 in the chamber 44, and a resistance to flow through the vortex device 46 increases. A reduced viscosity can be due to a relatively low ratio of desired fluid to undesired fluid in the fluid composition 36.

Relatively little of the fluid composition 36 flows into the chamber 44 via the inlet 52 in FIG. 3A, because the flow passage 50 is branched from the flow passage 42 in a manner such that most of the fluid composition remains in the flow passage 42. At relatively high velocities, high densities and/or low viscosities, the fluid composition 36 tends to flow past the flow passage 50.

In FIG. 3B, a velocity of the fluid composition 36 has decreased and/or a viscosity of the fluid composition has increased, and as a result, proportionately more of the fluid composition flows from the passage 42 and via the passage 50 to the inlet 52. The increased viscosity of the fluid composition 36 may be due to an increased ratio of desired to undesired fluids in the fluid composition.

Since, in FIG. 3B, the flows into the chamber 44 from the two inlets 48, 52 are oppositely directed (or at least the flow of the fluid composition through the inlet 52 opposes the flow through the inlet 48), they counteract each other. Thus, the fluid composition 36 flows more directly to the outlet 40 and a resistance to flow through the vortex device 46 is decreased, and the fluid composition has reduced (or no) rotation at the outlet 40.

Figure 4:
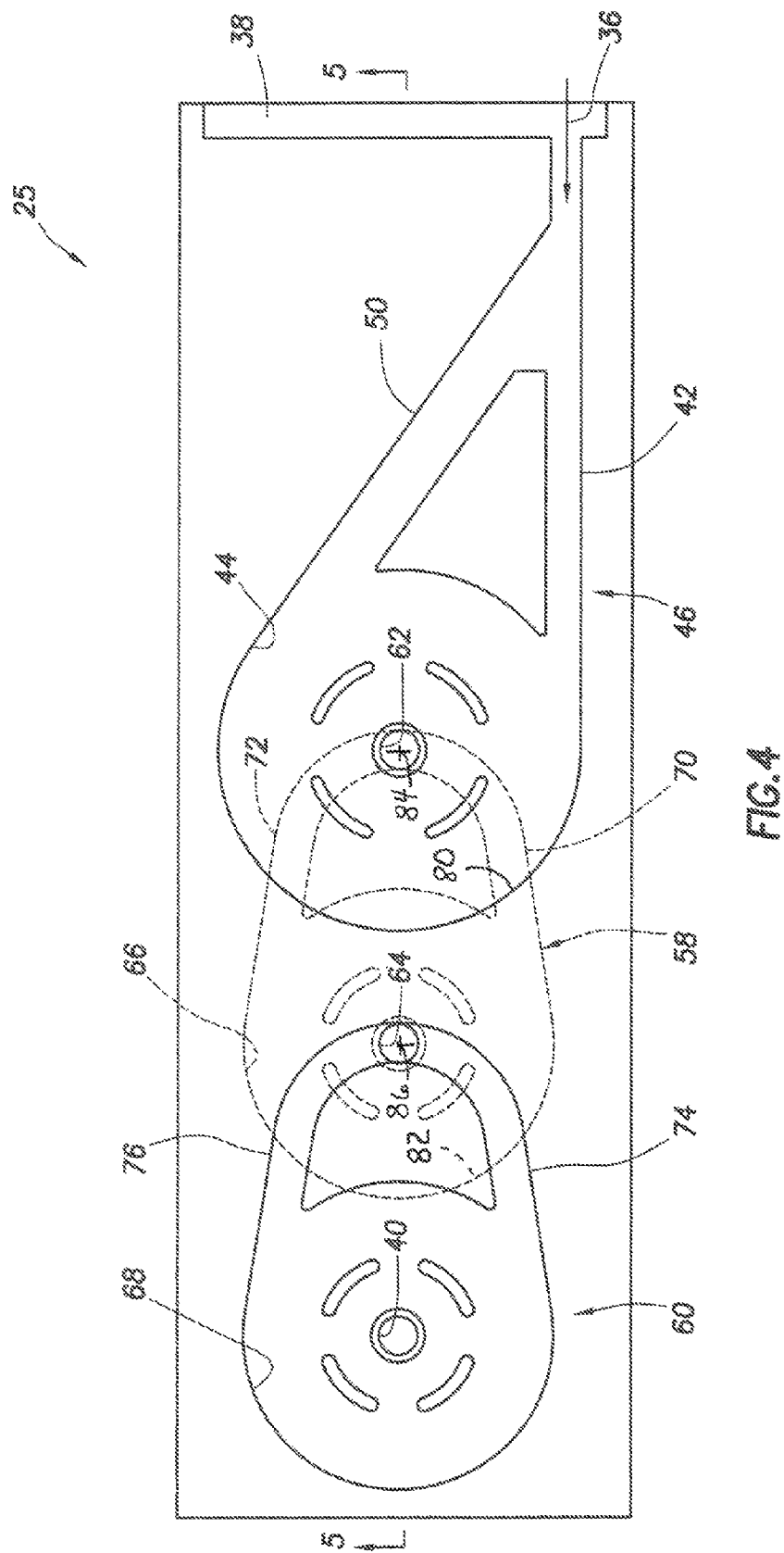
FIG. 4 is a representative cross-sectional view of another configuration of the variable flow resistance system.

Referring additionally now to FIG. 4, another configuration of the variable flow resistance system 25 is representatively illustrated. In this configuration, the vortex device 46 is used in series with two additional vortex devices 58, 60. Although three vortex devices 46, 58, 60 are depicted in FIG. 4, it will be appreciated that any number of vortex devices may be connected in series, in keeping with the principles of this disclosure.

An outlet 62 of the vortex device 46 corresponds to an inlet of the vortex device 58, and an outlet 64 of the vortex device 58 corresponds to an inlet of the vortex device 60. The fluid composition 36 flows from the system 25 inlet 38 to the chamber 44, from the chamber 44 to the vortex device 58 via the outlet/inlet 62, from the outlet/inlet 62 to a vortex chamber 66 of the vortex device 58, from the chamber 66 to the vortex device 60 via the outlet/inlet 64, from the outlet/inlet 64 to a vortex chamber 68 of the vortex device 60, and from the chamber 68 to the outlet 40 of the system 25.

Each of the vortex devices 58, 60 includes two passages 70, 72 and 74, 76, respectively, which function somewhat similar to the passages 42, 50 of the vortex device 46. However, the proportions of the fluid composition 36 which flows through each of the passages 70, 72 and 74, 76 varies based on a rotation of the fluid composition as it enters the respective vortex device 58, 60, as described more fully below.

Referring additionally now to FIG. 5, a cross-sectional view of the variable flow resistance system 25 is representatively illustrated, as viewed along line 5-5 of FIG. 4. In this view, the manner in which the outlet/inlet 62 and outlet/inlet 64 provide fluid communication between the vortex devices 46, 58, 60 can be readily seen.

In FIG. 5, it may also be seen that the vortex devices 46, 58, 60 are "stacked" in a compact manner, alternating orientation back and forth. However, it will be appreciated that the vortex devices 46, 58, 60 could be otherwise arranged, in keeping with the principles of this disclosure.

Figure 6A:
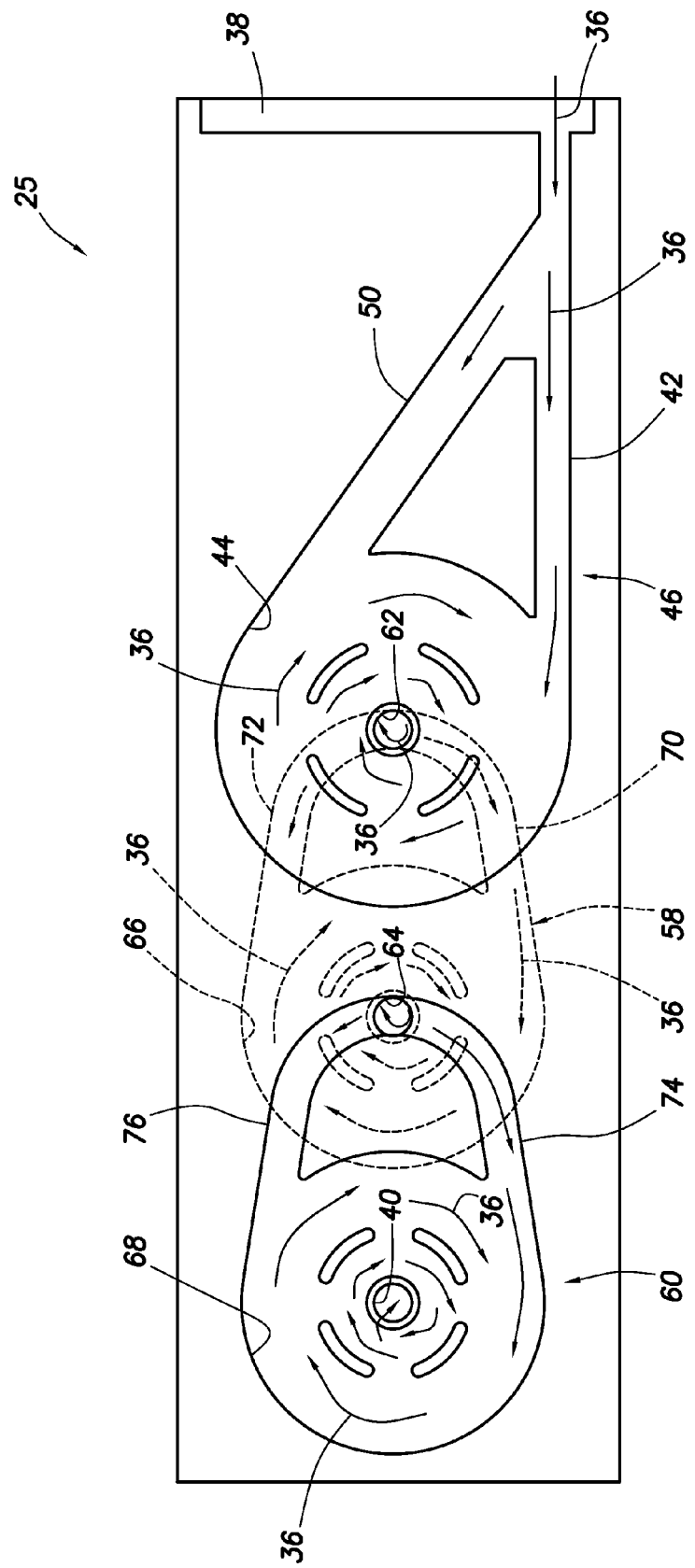
FIGS. 6A & B are representative cross-sectional views the variable flow resistance system of FIG. 4, depicting changes in flow resistance resulting from changes in characteristics of a fluid composition.
Figure 6B:
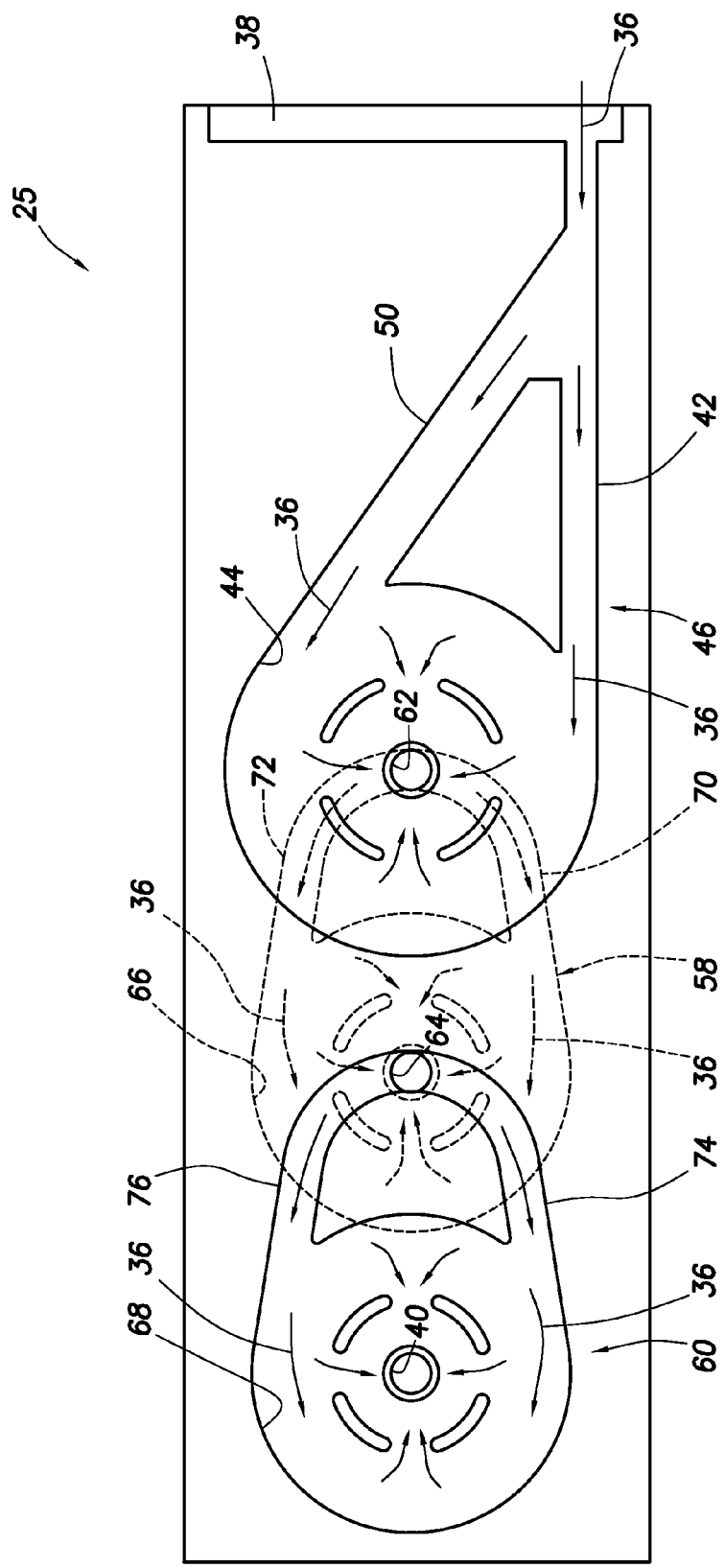

Referring additionally now to FIGS. 6A & B, the variable flow resistance system 25 of FIGS. 4 & 5 is depicted, with a relatively low viscosity, high density and/or high velocity fluid composition 36 flowing through the system in FIG. 6A, and with a relatively high viscosity, low density and/or low velocity fluid composition flowing through the system in FIG. 6B. These examples demonstrate how the resistance to flow through the system 25 varies based on certain characteristics of the fluid composition 36.

In FIG. 6A, significant spiraling flow of the fluid composition 36 is present in the vortex device 46 (similar to that described above in relation to FIG. 3A). As a result, the fluid composition 36 is rotating significantly when it flows from the chamber 44 to the vortex device 58 via the outlet/inlet 62.

This rotational flow of the fluid composition 36 causes a greater proportion of the fluid composition to flow through the passage 70, as compared to the proportion of the fluid composition which flows through the passage 72. The manner in which the rotating fluid composition 36 impinges on the curved walls of the passages 70, 72 at their intersection with the outlet/inlet 62 causes this difference in the proportions of the fluid composition which flows through each of the passages.

Since a greater proportion of the fluid composition 36 flows into the chamber 66 of the vortex device 58 via the passage 70, the fluid composition rotates within the chamber 66, similar to the manner in which the fluid composition flows spirally through the chamber 44 of the vortex device 46. This spiraling flow of the fluid composition 36 through the chamber 66 generates resistance to flow, with the resistance to flow increasing with increased rotational flow of the fluid composition in the chamber.

The fluid composition 36 rotates as it exits the chamber 66 via the outlet/inlet 64. This rotational flow of the fluid composition 36 causes a greater proportion of the fluid composition to flow through the passage 74, as compared to the proportion of the fluid composition which flows through the passage 76. Similar to that described above for the vortex chamber 58, the manner in which the rotating fluid composition 36 impinges on the curved walls of the passages 74, 76 at their intersection with the outlet/inlet 64 causes this difference in the proportions of the fluid composition which flows through each of the passages.

Since a greater proportion of the fluid composition 36 flows into the chamber 68 of the vortex device 60 via the passage 74, the fluid composition rotates within the chamber 68, similar to the manner in which the fluid composition flows spirally through the chamber 66 of the vortex device 58. This spiraling flow of the fluid composition 36 through the chamber 68 generates resistance to flow, with the resistance to flow increasing with increased rotational flow of the fluid composition in the chamber.

Thus, with the relatively high velocity and/or low viscosity fluid composition 36 in FIG. 6A, rotational flow and resistance to flow is increased in each of the vortex devices 46, 58, 60, so that overall flow resistance is much greater than that which would have been provided by only the single vortex device 46. In addition, the rotational flow through the chambers 66, 68 of the vortex devices 58, 60 is due to the rotational flow of the fluid composition 36 at each of the outlet/inlets 62, 64.

In FIG. 6B, a relatively high viscosity and/or low velocity fluid composition 36 flows through the system 25. Note that rotational flow of the fluid composition 36 in each of the chambers 44, 66, 68 is significantly reduced, and so the resistance to flow of the fluid composition through the chambers is also significantly reduced. Thus, the resistance to flow of the relatively high viscosity and/or low velocity fluid composition 36 is much less in FIG. 6B, as compared to the resistance to flow of the relatively low viscosity and/or high velocity fluid composition in FIG. 6A.

Note that any of the features of any of the configurations of the system 25 described above may be included in any of the other configurations of the system and, thus, it should be understood that these features are not exclusive to any one particular configuration of the system. The system 25 can be used in any type of well system (e.g., not only in the well system 10), and for accomplishing various purposes in various well operations, including but not limited to injection, stimulation, completion, production, conformance, drilling operations, etc.

It will be appreciated that the system 25 of FIGS. 4-6B provides significant advancements to the art of controlling flow in a well. The resistance to flow of the fluid composition 36 through the system 25 can be substantially increased by connecting the vortex devices 46, 58, 60 in series, and by resisting flow of the fluid composition in response to its rotation as it passes from one vortex device to the next.

The above disclosure provides to the art a variable flow resistance system 25 for use in a subterranean well. The system 25 can include a vortex device 58 or 60 through which a fluid composition 36 flows. A resistance to flow of the fluid composition 36 through the vortex device 58 or 60 is dependent on a rotation of the fluid composition 36 at an inlet 62 or 64 to the vortex device 58 or 60.

The resistance to flow of the fluid composition 36 through the vortex device 58 or 60 can increase in response to an increased rotation of the fluid composition 36 at the inlet 62 or 64 to the vortex device 58 or 60.

The rotation of the fluid composition 36 at the inlet 62 or 64 can increase in response to a decrease in viscosity of the fluid composition 36.

The rotation of the fluid composition 36 at the inlet 62 or 64 can increase in response to an increase in velocity of the fluid composition 36.

The rotation of the fluid composition 36 at the inlet 62 or 64 can increase in response to a decrease in a ratio of desired to undesired fluid in the fluid composition 36.

An outlet 64 of the vortex device 58 can comprise an inlet 64 of another vortex device 60. The inlet 64 of the vortex device 60 can comprise an outlet 64 of another vortex device 58.

The vortex device 58 can comprise at least first and second passages 70, 72 which receive the fluid composition 36 from an outlet 62 of another vortex device 46. A difference in proportions of the fluid composition 36 which flows through the respective first and second passages 70, 72 is dependent on the rotation of the fluid composition 36 at the outlet 62. The difference in the proportions of the fluid composition 36 which flows through the first and second passages 70, 72 may increase in response to an increase in velocity of the fluid composition 36.

Rotation of the fluid composition 36 in a vortex chamber 66 increases in response to an increase in the difference in the proportions of the fluid composition 36 which flows through the first and second passages 70, 72.

The above disclosure also describes a variable flow resistance system 25 which can include a first vortex 46 device having an outlet 62, and a second vortex device 58 which receives a fluid composition 36 from the outlet 62 of the first vortex device 46. A resistance to flow of the fluid composition 36 through the second vortex device 58 can be dependent on a rotation of the fluid composition 36 at the outlet 62 of the first vortex device 46.

The rotation of the fluid composition 36 at the outlet 62 may increase in response to a decrease in viscosity of the fluid composition 36, in response to an increase in velocity of the fluid composition 36 and/or in response to a decrease in a ratio of desired to undesired fluid in the fluid composition 36.

The resistance to flow of the fluid composition 36 through the second vortex device 58 can increase in response to an increase in the rotation of the fluid composition 36 at the outlet 62 of the first vortex device 46.

An outlet 64 of the second vortex device 58 can comprise an inlet 64 of a third vortex device 60.

The second vortex device 58 can include at least first and second passages 70, 72 which receive the fluid composition 36 from the outlet 62 of the first vortex device 46. A difference in proportions of the fluid composition 36 which flow through the respective first and second passages 70, 72 is dependent on the rotation of the fluid composition 36 at the outlet 62 of the first vortex device 46.

The difference in the proportions of the fluid composition 36 which flows through the first and second passages 70, 72 may increase in response to an increase in velocity of the fluid composition 36.

Rotation of the fluid composition 36 in a vortex chamber 66 of the second vortex device 58 may increase in response to an increase in the difference in the proportions of the fluid composition 36 which flows through the first and second passages 70, 72.

The above disclosure also describes a variable flow resistance system 25 which can include a first vortex device 46 which causes increased rotation of a fluid composition 36 at an outlet 62 of the first vortex device 46 in response to an increase in a velocity of the fluid composition 36, and a second vortex device 58 which receives the fluid composition 36 from the outlet 62 of the first vortex device 46. A resistance to flow of the fluid composition 36 through the second vortex device 58 may be dependent on the rotation of the fluid composition 36 at the outlet 62 of the first vortex device 46.

Note that the vortex devices 46, 58, 60 may be of the type known to those skilled in the art as fluid "diodes."

A well device (e.g., the variable flow resistance system 25) for installation in a wellbore 12 in a subterranean zone (e.g., in formation 20) can include a first fluid diode (e.g., vortex device 46) comprising: a first interior surface 80 (see FIGS. 4 & 5) that defines a first interior chamber 44, and an outlet 62 from the first interior chamber 44, the first interior surface 80 operable to direct fluid (e.g., fluid composition 36) to rotate in a rotational direction through the outlet 62; and a second fluid diode (e.g., vortex device 58) comprising: a second interior surface 82 that defines a second interior chamber 66 in fluid communication with the outlet 62, the second interior surface 82 operable to direct fluid (e.g., fluid composition 36) to rotate in the rotational direction in response to receiving the fluid rotating in the rotational direction through the outlet 62.

The second fluid diode can include an inlet (in the FIGS. 4-6B example, the inlet of the chamber 58 is the same as the outlet 62 of the chamber 44) operable to receive the fluid 36 directly from the outlet 62. The second interior chamber 66 can comprise: a cylindroidal chamber 66, a first flow passage 70 from the inlet 62 to the cylindroidal chamber 66, and a second flow passage 72 from the inlet 62 to the cylindroidal chamber 66.

The second interior surface 82 may be operable to direct a majority of the fluid 36 to the first flow passage 70 in response to receiving the fluid 36 rotating in the rotational direction through the inlet 62.

The first interior surface 80 may be operable to direct fluid 36 to rotate in a rotational direction about a first axis of rotation 84, and the second interior surface 82 may be operable to direct fluid 36 to rotate in a rotational direction about a second axis of rotation 86. The first axis of rotation 84 can be parallel to the second axis of rotation 86.

The first fluid diode 46 and the second fluid diode 58 may be in fluid communication between an interior and an exterior of the well device (e.g., the variable flow resistance system 25). The first fluid diode 46 and the second fluid diode 58 can be in fluid communication between the interior and the exterior to communicate production fluid 36 from the exterior of the well device 25 to the interior of the well device 25. The well device 25 may comprise a section of a completion string 22.

The first and second fluid diodes 46, 58 can be in fluid communication between the interior and the exterior to communicate injection fluid 36 from the interior of the well device 25 to the exterior of the well device 25. The well device 25 may comprise a section of a working string 22.

The outlet 62 can comprise a first outlet 62, the first fluid diode 46 can further comprise a first inlet 38, the first interior surface 80 may include a first side perimeter surface 80 and first opposing end surfaces 88, a greatest distance between the first opposing end surfaces 88 can be smaller than a largest dimension of the first opposing end surfaces 88, and the first side perimeter surface 80 may be operable to direct flow from the first inlet 38 to rotate about the first outlet 62.

The second fluid diode 58 can comprise a second inlet 62 operable to receive the fluid 36 directly from the first outlet 62, the second interior surface 82 may include a second side perimeter surface 82 and second opposing end surfaces 90, a greatest distance between the second opposing end surfaces 90 may be smaller than a largest dimension of the second opposing end surfaces 90, and the second side perimeter surface 82 can be operable to direct flow from the second inlet 62 to rotate about a second outlet 64.

A method of controlling flow in a wellbore 12 in a subterranean zone 20 can include communicating fluid 36 through a first fluid diode 46 and a second fluid diode 58 in a flow path between an interior and an exterior of a well device 25 in the subterranean zone 20. Communicating the fluid 36 through the first fluid diode 46 and the second fluid diode 58 can cause the fluid 36 to rotate within the first fluid diode 46 in a rotational direction and to rotate within the second fluid diode 58 in the rotational direction.

The fluid 36 may comprise a production or injection fluid.

Communicating the fluid 36 through the first fluid diode 46 and the second fluid diode 58 can control a resistance to a flow of the fluid 36 between the interior and the exterior based on a characteristic of the flow. The characteristic may comprise at least one of viscosity, velocity or density.

A resistance to flow through the second fluid diode 58 can be based at least in part on a characteristic of inflow received by the second fluid diode 58 from the first fluid diode 46.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A well device for installation in a wellbore in a subterranean zone, comprising:
    a first fluid diode comprising:
        a first interior surface that defines a first interior chamber, and
        an outlet from the first interior chamber, the first interior surface operable to direct fluid to rotate in a rotational direction through the outlet; and
    a second fluid diode comprising:
        an inlet operable to receive the fluid directly from the outlet, and
        a second interior surface that defines a second interior chamber in fluid communication with the outlet, wherein the second interior chamber comprises a cylindroidal chamber, a first flow passage from the inlet to the cylindroidal chamber, and a second flow passage from the inlet to the cylindroidal chamber, and wherein the second interior surface is operable to direct fluid to rotate in the rotational direction in response to receiving the fluid rotating in the rotational direction through the outlet.

2. The well device of claim 1, wherein the second interior surface is operable to direct a majority of the fluid to the first flow passage in response to receiving the fluid rotating in the rotational direction through the inlet.

3. The well device of claim 1, wherein the first interior surface is operable to direct fluid to rotate in the rotational direction about a first axis of rotation, and the second interior surface is operable to direct fluid to rotate in the rotational direction about a second axis of rotation.

4. The well device of claim 3, wherein the first axis of rotation is parallel to the second axis of rotation.

5. The well device of claim 1, wherein the first fluid diode and the second fluid diode are in fluid communication between an interior and an exterior of the well device.

6. The well device of claim 5, wherein the first fluid diode and the second fluid diode are in fluid communication between the interior and the exterior to communicate production fluid from the exterior of the well device to the interior of the well device.

7. The well device of claim 6, wherein the well device comprises a section of a completion string.

8. The well device of claim 5, wherein the first and second fluid diodes are in fluid communication between the interior and the exterior to communicate injection fluid from the interior of the well device to the exterior of the well device.

9. The well device of claim 8, wherein the well device comprises a section of a working string.

10. The well device of claim 1, wherein the outlet comprises a first outlet, the first fluid diode further comprises a first inlet, the first interior surface includes a first side perimeter surface and first opposing end surfaces, a greatest distance between the first opposing end surfaces is smaller than a largest dimension of the first opposing end surfaces, and the first side perimeter surface is operable to direct flow from the first inlet to rotate about the first outlet.

11. The well device of claim 10, wherein the second fluid diode further comprises a second inlet operable to receive the fluid directly from the first outlet, the second interior surface includes a second side perimeter surface and second opposing end surfaces, a greatest distance between the second opposing end surfaces is smaller than a largest dimension of the second opposing end surfaces, and the second side perimeter surface is operable to direct flow from the second inlet to rotate about a second outlet.

12. A method of controlling flow in a wellbore in a subterranean zone, comprising:
    providing first and second fluid diodes, each fluid diode comprising an inlet which branches into a pair of flow passages which selectively deliver fluid to a vortex chamber having an outlet, wherein the inlet of the second fluid diode receives the fluid from the outlet of the first fluid diode; and
    communicating the fluid through the first fluid diode and the second fluid diode in a flow path between an interior and an exterior of a well device in the subterranean zone, wherein the communicating causes the fluid to rotate within the first fluid diode in a rotational direction and to rotate within the second fluid diode in the rotational direction.

13. The method of claim 12, wherein the fluid comprises a production fluid.

14. The method of claim 12, wherein the fluid comprises an injection fluid.

15. The method of claim 12, wherein the communicating controls a resistance to a flow of the fluid between the interior and the exterior based on a characteristic of the flow.

16. The method of claim 15, wherein the characteristic comprises at least one of viscosity, velocity and density.

17. The method of claim 15, wherein a resistance to flow through the second fluid diode is based at least in part on a characteristic of inflow received by the second fluid diode from the first fluid diode.

* * * * *